United States Patent
Ferguson

(10) Patent No.: US 9,355,562 B1
(45) Date of Patent: May 31, 2016

(54) USING OTHER VEHICLE TRAJECTORIES TO AID AUTONOMOUS VEHICLES DRIVING THROUGH PARTIALLY KNOWN AREAS

(75) Inventor: David I. Ferguson, San Francisco, CA (US)

(73) Assignee: Google Inc., Mountain View, CA (US)

( * ) Notice: Subject to any disclaimer, the term of this patent is extended or adjusted under 35 U.S.C. 154(b) by 569 days.

(21) Appl. No.: 13/585,344

(22) Filed: Aug. 14, 2012

(51) Int. Cl.
- *G08G 1/16* (2006.01)
- *B60W 30/12* (2006.01)
- *G08G 1/0962* (2006.01)

(52) U.S. Cl.
CPC ...................................... *G08G 1/167* (2013.01)

(58) Field of Classification Search
CPC ....... G08G 1/167; G08G 1/163; G08G 1/166; G08G 1/09626; B60W 30/12
See application file for complete search history.

(56) References Cited

U.S. PATENT DOCUMENTS

| | | | |
|---|---|---|---|
| 7,979,172 B2 | 7/2011 | Breed | |
| 2008/0082261 A1* | 4/2008 | Tengler et al. | 701/210 |
| 2008/0133120 A1 | 6/2008 | Romanick | |
| 2010/0054538 A1 | 3/2010 | Boon | |
| 2010/0332125 A1* | 12/2010 | Tan et al. | 701/207 |
| 2011/0118900 A1 | 5/2011 | Uchida et al. | |
| 2011/0231088 A1 | 9/2011 | Nishibashi et al. | |
| 2014/0032108 A1* | 1/2014 | Zeng et al. | 701/533 |

* cited by examiner

*Primary Examiner* — Yonel Beaulieu
*Assistant Examiner* — Basil T Jos
(74) *Attorney, Agent, or Firm* — McDonnell Boehnen Hulbert & Berghoff LLP

(57) ABSTRACT

Methods and devices for controlling a vehicle in an autonomous mode are disclosed. In one aspect, an example method is disclosed that includes obtaining, by a computer system, lane information that provides an estimated location of a lane of a road on which a vehicle is travelling, where the computer system is configured to control the vehicle in an autonomous mode. The example method further includes determining, by the computer system, that the lane information has become unavailable or unreliable and, in response to determining that the lane information has become unavailable or unreliable, the computer system selecting a predetermined trajectory from a plurality of predetermined trajectories and controlling the vehicle to travel along the selected predetermined trajectory.

20 Claims, 13 Drawing Sheets

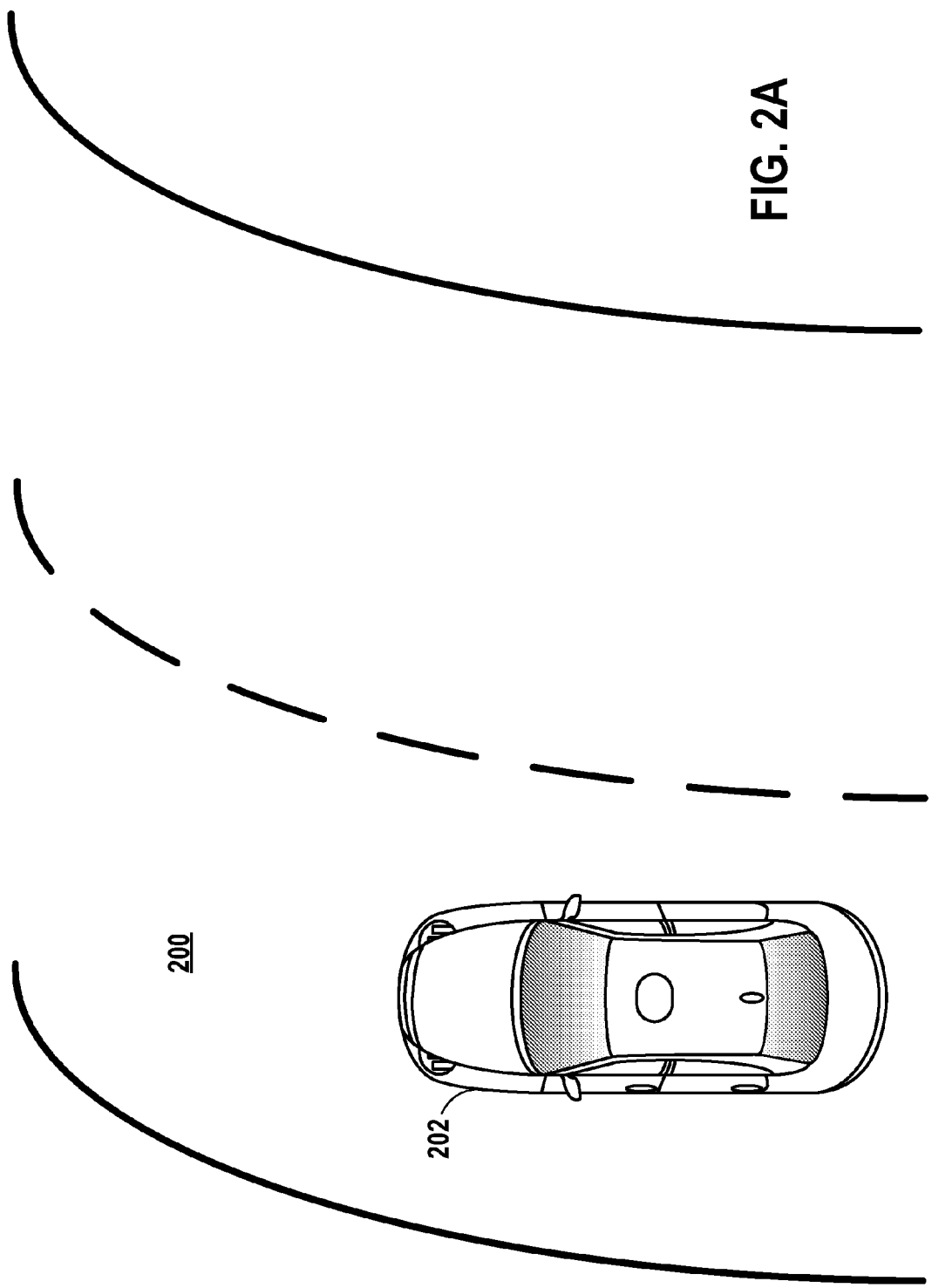

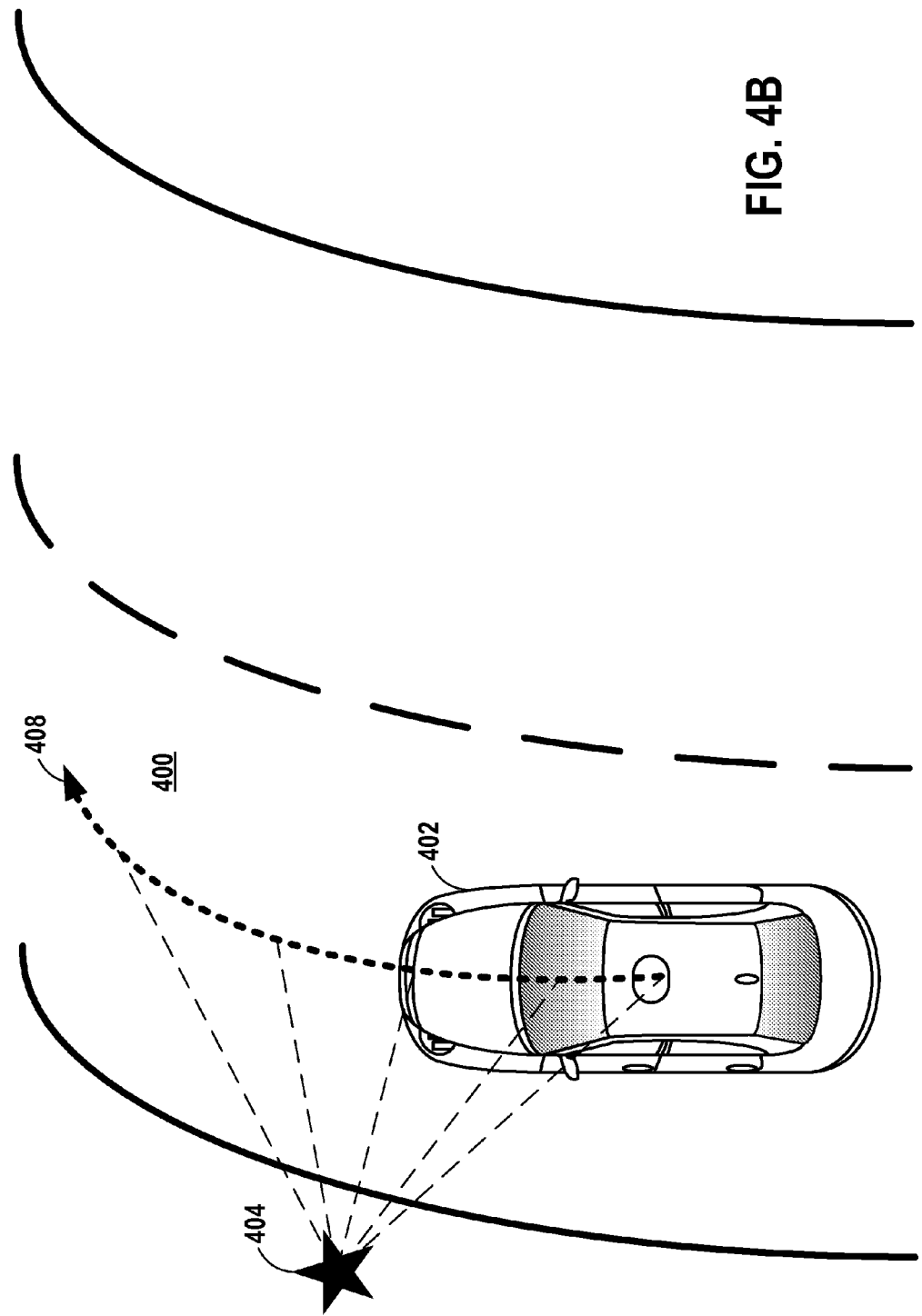

USING OTHER VEHICLE TRAJECTORIES TO AID AUTONOMOUS VEHICLES DRIVING THROUGH PARTIALLY KNOWN AREAS

BACKGROUND

Some vehicles are configured to operate in an autonomous mode in which the vehicle navigates through an environment with little or no input from a driver. Such a vehicle typically includes one or more sensors that are configured to sense information about the environment. The vehicle may use the sensed information to navigate through the environment. For example, if the sensors sense that the vehicle is approaching an obstacle, the vehicle may navigate around the obstacle.

SUMMARY

In one aspect, an example method is disclosed that includes obtaining, by a computer system, lane information that provides an estimated location of a lane of a road on which a vehicle is travelling, where the computer system is configured to control the vehicle in an autonomous mode. The example method further includes determining, by the computer system, that the lane information has become unavailable or unreliable and, in response to determining that the lane information has become unavailable or unreliable, the computer system selecting a predetermined trajectory from a plurality of predetermined trajectories and controlling the vehicle to travel along the selected predetermined trajectory.

In another aspect, a non-transitory computer-readable medium is disclosed having stored therein instructions executable by a computing device to cause the computing device to perform the example method described above.

In yet another aspect, an example vehicle is disclosed that includes at least one processor and data storage comprising a plurality of predetermined trajectories and instructions. The instructions are executable by the at least one processor to obtain lane information that provides an estimated location of a lane of a road on which the vehicle is travelling, determine that the lane information has become unavailable or unreliable and, in response to determining that the lane information has become unavailable or unreliable, select a predetermined trajectory from the plurality of predetermined trajectories and control the vehicle to travel along the selected predetermined trajectory.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIGS. 2A-B illustrate an example implementation of the example method, in accordance with an embodiment.

FIGS. 4A-B illustrate an example implementation of the example method, in accordance with an embodiment.

DETAILED DESCRIPTION

The following detailed description describes various features and functions of the disclosed systems and methods with reference to the accompanying figures. In the figures, similar symbols typically identify similar components, unless context dictates otherwise. The illustrative system and method embodiments described herein are not meant to be limiting. It will be readily understood that certain aspects of the disclosed systems and methods can be arranged and combined in a wide variety of different configurations, all of which are contemplated herein.

A vehicle may include a computer system that is configured to control the vehicle in an autonomous mode. To this end, the computer system may be configured to obtain lane information that provides an estimated location of a lane of a road on which the vehicle is travelling. The lane information may be based on, for example, a predetermined map of the road and/or lane markings on the road. Other types of lane information are possible as well.

At some point, the vehicle may determine that the lane information has become unavailable or unreliable. For example, the vehicle may determine that the lane information is missing from the predetermined map of the road, the vehicle may determine that there is an error in the predetermined map (e.g., the lane information in the predetermined map of the road may be incorrect), the vehicle may no longer be able to access the predetermined map, the vehicle may no longer be able to detect the lane markings on the road, and/or the vehicle may detect contradictory lane markings on the road. Other examples are possible as well.

In response to determining that the lane information has become unavailable or unreliable, the computer system may select a predetermined trajectory from a plurality of predetermined trajectories. The computer system may then control the vehicle to travel along the selected predetermined trajectory.

In this manner, even if the vehicle is unable to rely on the lane information to estimate a location of the lane on the road, the vehicle may avoid colliding with neighboring vehicles and/or other obstacles.

Figure 1:
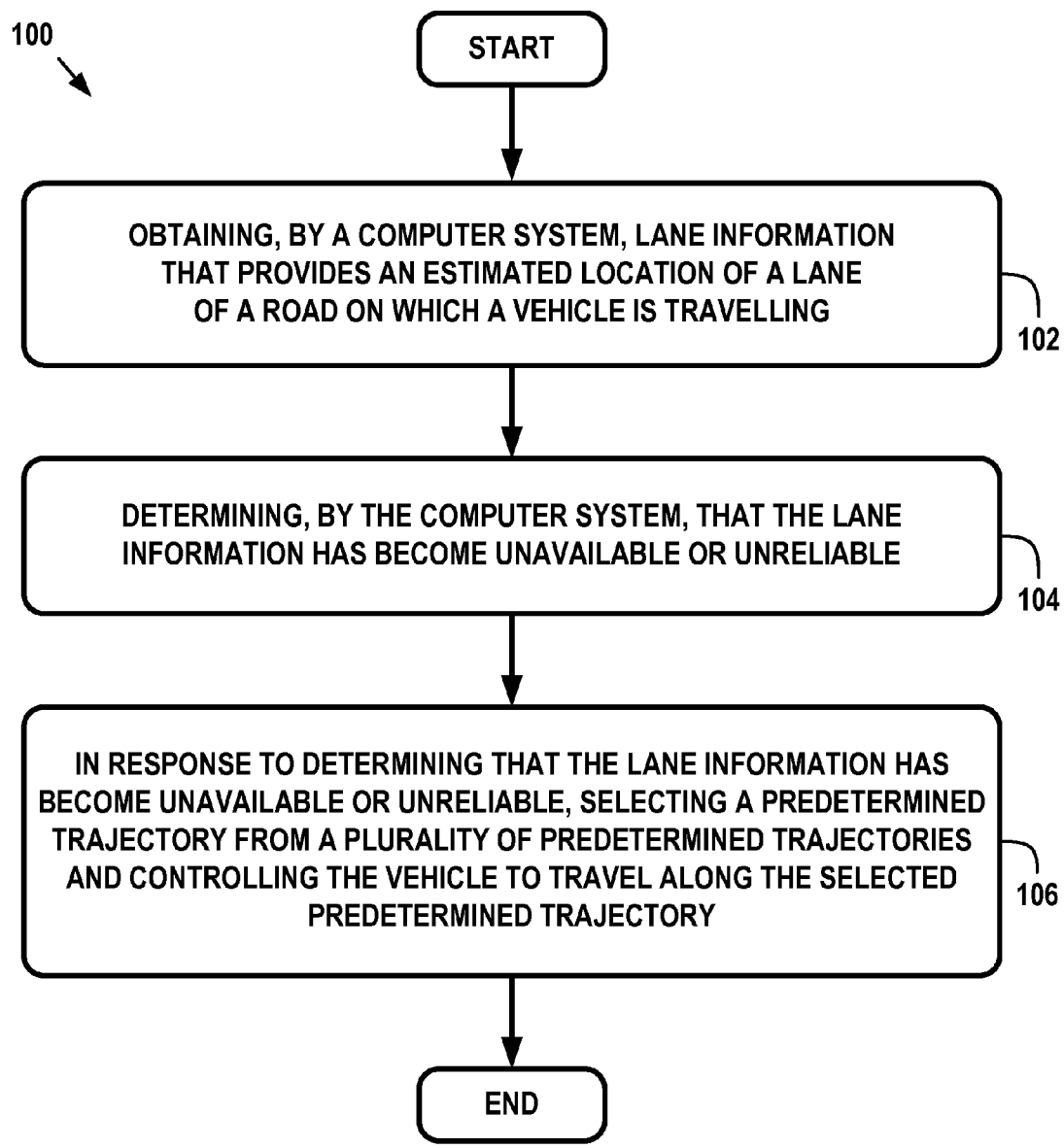
FIG. 1 is a flow chart illustrating an example method, in accordance with an embodiment.

FIG. 1 is a flow chart illustrating an example method 100, in accordance with an embodiment. Method 100 shown in FIG. 1 presents an embodiment of a method that, for example, could be used with the vehicles described herein. Method 100 may include one or more operations, functions, or actions as illustrated by one or more of blocks 102-106. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 100 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer-readable medium, such as, for example, a storage device including a disk or hard drive. The computer-readable medium may include a non-transitory computer-readable medium, for example, such as computer-readable media that store data for short periods of time like register memory, processor cache, and Random Access Memory (RAM). The computer-readable medium may also include non-transitory media, such as secondary or persistent long term storage, like read only memory (ROM), optical or magnetic disks, and compact-disc read only memory (CD-ROM), for example. The computer-readable media may also be any other volatile or non-volatile storage systems. The computer-readable medium may be considered a computer-readable storage medium, a tangible storage device, or other article of manufacture, for example.

In addition, for the method 100 and other processes and methods disclosed herein, each block may represent circuitry that is configured to perform the specific logical functions in the process.

The method 100 begins at block 102 where a computer system configured to control a vehicle in an autonomous mode obtains lane information that provides an estimated location of a lane of a road on which the vehicle is travelling. The lane information may take a number of forms.

In some embodiments, the lane information may include a geographic location of the vehicle and a predetermined map of the road. The computer system may determine the geographic location of the vehicle by, for example, querying a location server for the geographic location of the vehicle. Alternatively, if the predetermined map indicates a geographic location of at least two objects near the vehicle, the computer system may determine the geographic location of the vehicle by, for example, using a laser rangefinder or light detection and ranging (LIDAR) unit to estimate a distance from the vehicle to the at least two objects near the vehicle and determining the geographic location of the vehicle using triangulation. Other examples are possible as well. In any case, the computer system may then locate the geographic location of the vehicle on the predetermined map. The predetermined map may include lane information indicating a location of the lane on the road. Accordingly, the computer system may use the geographic location of the vehicle and the geographic location of the lane in the predetermined map to determine a location of the lane relative to the vehicle.

In other embodiments, the lane information may include lane markings on the road, and the computer system may use one or more sensors to sense the lane markings. For example, the computer system may use an image-capture device to capture images of the road and may detect the lane markings by analyzing the images for predetermined colors, shapes, and/or brightnesses that are similar to a predetermined color, shape, and/or brightness of the lane markings. As another example, the computer system may project a laser onto the road and may detect the lane markings by analyzing reflections off the road for an intensity that is similar to a predetermined intensity of a reflection off the lane markings. Other examples are possible as well. In any case, once the computer system has sensed the lane markings, the computer system may estimate the location of the lane based on the sensed lane markings.

In still other embodiments, the lane information may include a leading vehicle that is in front of the vehicle in the lane. The computer system may estimate a path of the leading vehicle using, for example, a laser rangefinder and/or a LIDAR unit. Other examples are possible as well. Once the computer system has estimated the path of the leading vehicle, the computer system may estimate the location of the lane based on the estimated path. For example, the computer system may estimate the location of the lane to include the estimated path (e.g., extend by half of a predetermined lane width on either side of the estimated path). Other examples are possible as well.

The lane information may take other forms as well.

At block 104, the computer system may determine that the lane information has become unavailable or unreliable. For example, in embodiments where the lane information includes a predetermined map of the road, the computer system may determine that the lane information has become unavailable or unreliable when no predetermined map of the road is available, when the lane information is not included in the predetermined map, or when there is an error in the predetermined map. As another example, in embodiments where the lane information includes a geographic location of the vehicle, the computer system may determine that the lane information has become unavailable or unreliable when the computer system is unable to communicate with a location server. As yet another example, in embodiments where the lane information includes lane markings, the computer system may determine that the lane information has become unavailable or unreliable when no lane markings are present or are difficult to sense (e.g., because the lane markings have worn off or been removed due to construction) and/or when contradictory lane markings are present (e.g., because the lane markings have been repainted due to construction). As still another example, in embodiments where the lane information includes a leading vehicle, the computer system may determine that the lane information has become unavailable or unreliable when the leading vehicle becomes too far away or has an inestimable path (e.g., because the leading vehicle is changing lanes, swerving, etc.). Other examples are possible as well.

In some embodiments, the computer system may maintain a predetermined threshold for the lane information, and the computer system may determine that the lane information has become unavailable or unreliable when the computer system detects that a confidence of the lane information (e.g., how confident the computer system is that the lane information is reliable) is below the predetermined threshold. In some embodiments, the computer system may additionally maintain a predetermined time period for the lane information, and the computer system may determine that the lane information has become unavailable or unreliable when the computer system detects that a confidence of the lane information is below the predetermined threshold for at least the predetermined amount of time. Other predetermined thresholds are possible as well.

At block 106, in response to determining that the lane information has become unavailable or unreliable, the computer system may select a predetermined trajectory from a plurality of predetermined trajectories. The computer system may select the predetermined trajectory in a number of ways.

In some embodiments, the computer system may read the selected predetermined trajectory from data storage at the vehicle. For example, the computer system may store the plurality of predetermined trajectories in the data storage and may select as the selected predetermined trajectory a predetermined trajectory in the plurality of predetermined trajectories that begins near and/or spans a last-known or estimated (e.g., using triangulation, as described above) geographic location of the vehicle. Other examples are possible as well.

Alternatively, the computer system may query a server for the selected predetermined trajectory. The query may include, for example, a last-known or estimated geographic location of the vehicle and/or one or more images captured at the vehicle. In embodiments where the query includes a last-known or estimated geographic location of the vehicle, the server may select one or more predetermined trajectories that begin near and/or span the last-known or estimated geographic location of the vehicle. Alternatively or additionally, in embodiments where the query includes one or more images captured at the device, the server may determine an estimated geographic location of the vehicle based on the one or more images (e.g., by comparing the one or more images to a database of images having known locations) and may then select one or more predetermined trajectories that begin near and/or span the estimated geographic location of the vehicle. The server may select the one or more predetermined trajectories in other manners as well.

The one or more selected predetermined trajectories may include, for example, predetermined trajectories that begin within a predetermined distance of the last-known or estimated geographic location of the vehicle and/or a predetermined threshold number of predetermined trajectories that begin closest to the last-known or estimated geographic location of the vehicle. Other predetermined trajectories are possible as well.

In embodiments where the server selects more than one predetermined trajectory, the server may provide the selected more than one predetermined trajectories to the computer system, and the computer system may select the selected predetermined trajectory from among the one or more predetermined trajectories received from the server. For example, the computer system may select as the selected predetermined trajectory a predetermined trajectory in the one or more predetermined trajectories that begins near and/or spans a last-known or estimated (e.g., using triangulation, as described above) geographic location of the vehicle. Other examples are possible as well. Alternatively, in embodiments where the server selects only one predetermined trajectory, the server may provide the predetermined trajectory to the computer system and the computer system may use the received predetermined trajectory as the selected predetermined trajectory.

The computer system may select the predetermined trajectory in other ways as well.

One or more of the plurality of predetermined trajectories may be, for example, a trajectory previously travelled by another vehicle. Alternatively or additionally, one or more of the plurality of predetermined trajectories may be a combination (e.g., a mean, a weighted mean, a truncated mean, a median, a mode, etc.) of trajectories previously travelled by other vehicles. Other predetermined trajectories are possible as well. The other vehicles that have previously travelled the predetermined trajectories may be, for example, vehicles determined to be reliable, such as vehicles operated by a particular company or organization and/or vehicles operated by trained drivers. Other vehicles are possible as well.

Further, one or more of the plurality of predetermined trajectories may be expressed in absolute geographic coordinates. Alternatively or additionally, one or more of the plurality of predetermined trajectories may be expressed relative to a predetermined location on the road, such as a last-known or estimated geographic location of the vehicle or a landmark. The plurality of predetermined trajectories may be expressed in other ways as well.

At block 106, further in response to determining that the lane information has become unavailable or unreliable, the computer system may control the vehicle to travel along the selected predetermined trajectory. To this end, the computer system may continuously or periodically use one or more sensors on the vehicle to determine a geographic or relative location of the vehicle and may compare the determined geographic or relative location of the vehicle with the selected predetermined trajectory. If the determined geographic or relative location of the vehicle is not along the selected predetermined trajectory, the computer system may move the vehicle towards the trajectory.

In some embodiments, while controlling the vehicle to travel along the selected predetermined trajectory, the computer system may periodically obtain updated lane information that provides an updated estimated location of the lane. The update lane information may take any of the forms described above for the lane information. When the computer system determines that the updated lane information has become reliable, the computer system may cease to control the vehicle to travel along the selected predetermined trajectory, and may once again control the vehicle in an autonomous mode based on the updated estimated location of the lane.

For purposes of illustration, a number of example implementations of the method 100 are described below in connection with FIGS. 2A-4B, and example predetermined trajectories are described below in connection with FIGS. 5A-C. It is to be understood, however, that the example implementations are illustrative only and are not meant to limiting. Other example implementations are possible as well.

FIG. 2A illustrates an example implementation of the example method, in accordance with an embodiment. As shown in FIG. 2A, a vehicle 202 is travelling in a lane 200 on a road. The vehicle 202 includes a computer system (not shown) that is configured to control the vehicle 202 in an autonomous mode. To this end, the vehicle 202 may obtain lane information that provides an estimate of a location of the lane 200 on the road. The lane information may, for example, be based on a predetermined map of the road. Other lane information is possible as well.

At some point, the vehicle 202 may determine that the lane information has become unreliable. For example, the vehicle 202 may detect that the lane information is not included in the predetermined map of the road. As another example, the vehicle 202 may detect that there is an error in the predetermined map. To this end, the vehicle 202 may include one or more sensors (not shown) configured to sense information about an environment surrounding the vehicle 202. The vehicle 202 may detect that there is an error in the predetermined map when, for instance, the vehicle 202 detects that the sensed information contradicts the predetermined map (e.g., the sensed information may indicate that a portion of the road is under construction while the predetermined map may indicate that the lane spans the portion of the road that is under construction). Other examples are possible as well.

Figure 2B:
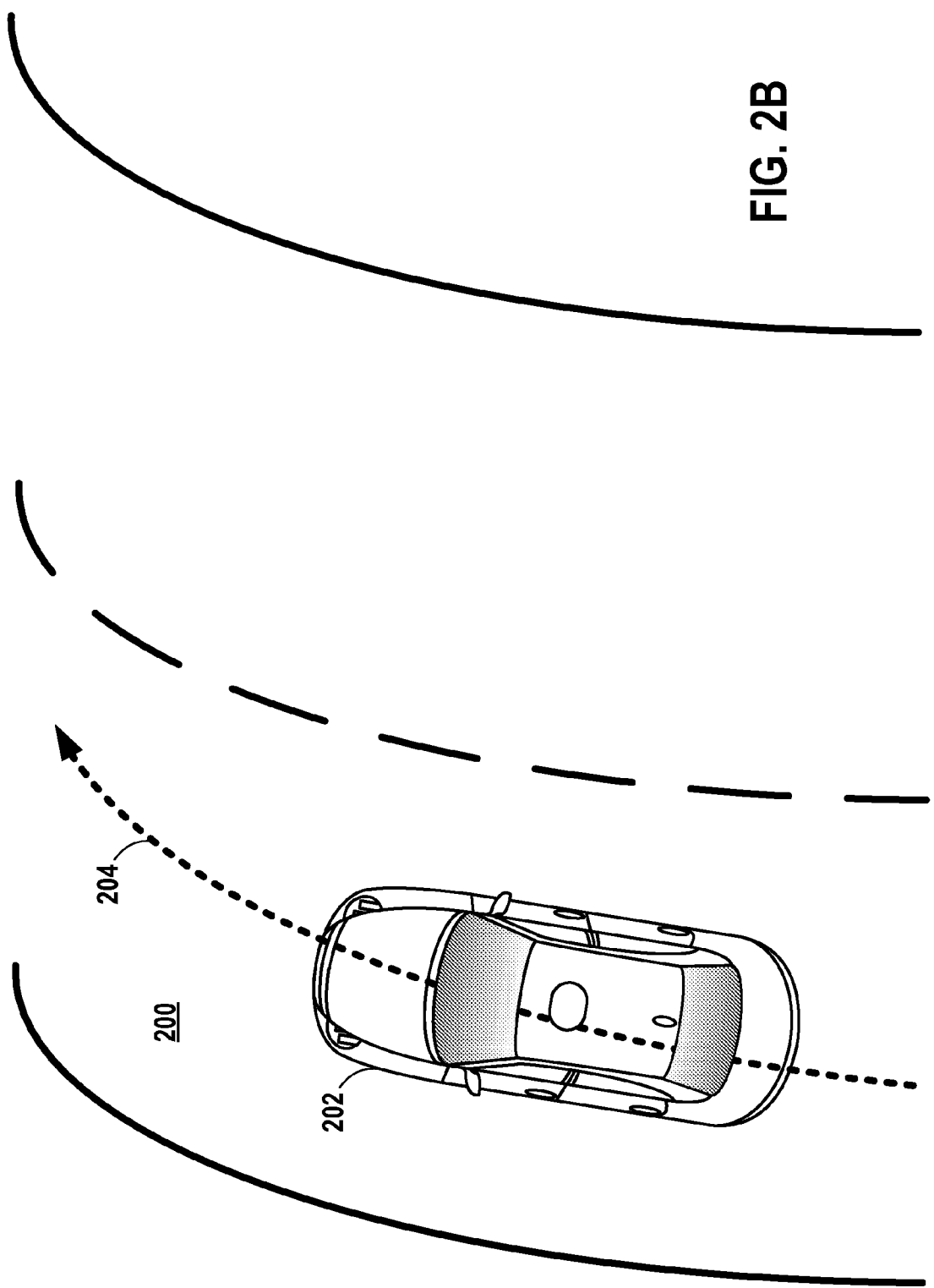

In response to determining that the lane information has become unreliable, the vehicle 202 may select a predetermined trajectory from a plurality of predetermined trajectories, as described above. The selected predetermined trajectory 204 is shown in FIG. 2B. Further in response to determining that the lane information has become unreliable, the vehicle 202 may travel along the selected predetermined trajectory 204.

As shown in FIG. 2B, the selected predetermined trajectory 202 is expressed in absolute geographic coordinates (e.g., latitude and longitude). In other embodiments, however, the selected predetermined trajectory may be expressed relative to a predetermined location on the road, such as a last-known or estimated geographic location of the vehicle or a landmark. Selected predetermined trajectories that are expressed relative to predetermined locations on the road are further described in connection with FIGS. 3A-4B.

Figure 3A:
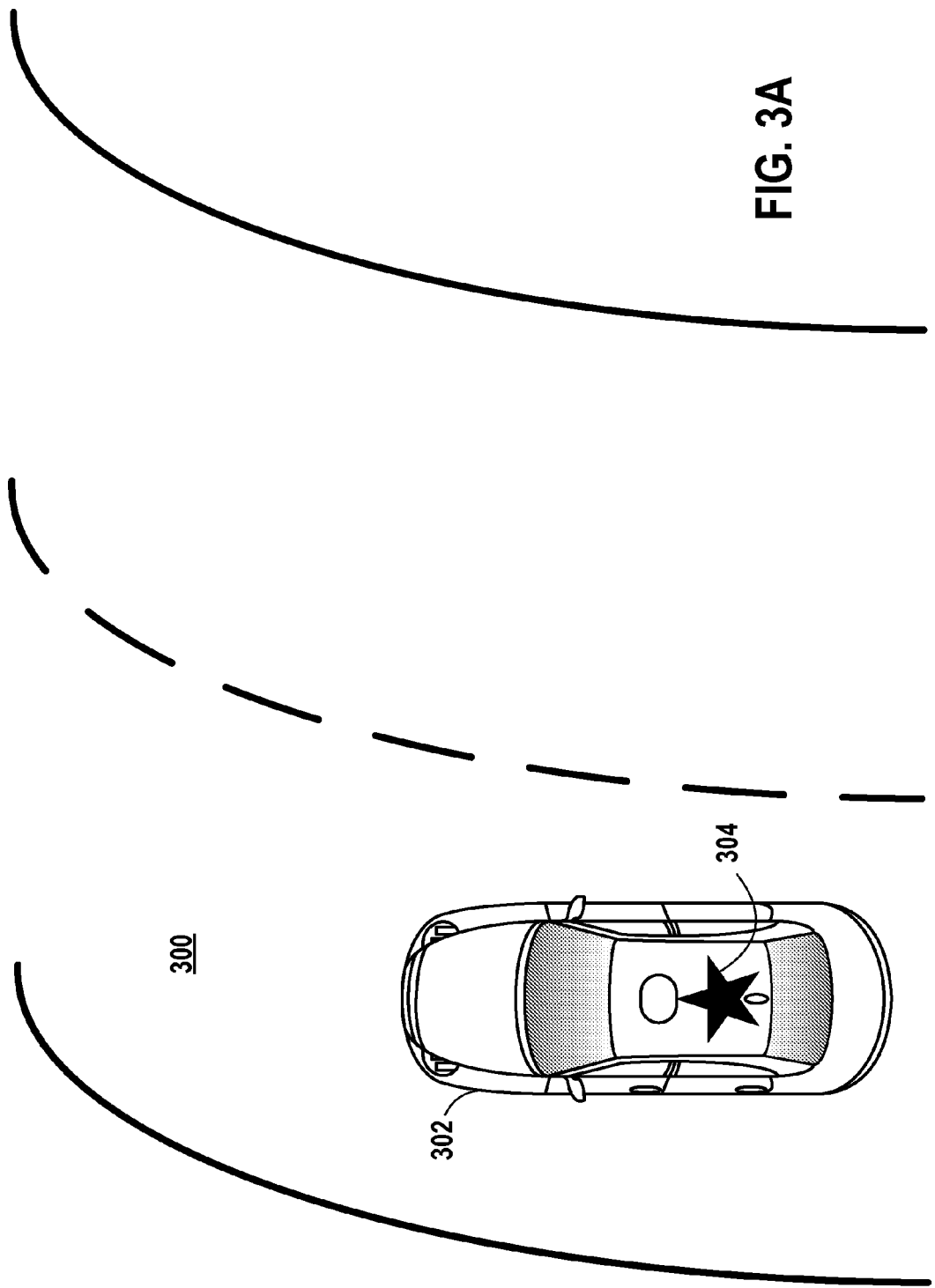
FIGS. 3A-B illustrate an example implementation of the example method, in accordance with an embodiment.

FIG. 3A illustrates an example implementation of the example method, in accordance with an embodiment. As shown in FIG. 3A, a vehicle 302 is travelling in a lane 300 on a road. The vehicle 302 includes a computer system (not shown) that is configured to control the vehicle 302 in an autonomous mode. To this end, the vehicle 302 may obtain lane information that provides an estimate of a location of the lane 300 on the road, as described above.

At some point, the vehicle 302 may determine that the lane information has become unreliable, as described above. In response to determining that the lane information has become unreliable, the vehicle 302 may select a predetermined trajectory from a plurality of predetermined trajectories. To this end, the vehicle 302 may determine a last-known or estimated geographic location 304 of the vehicle 302. The vehicle 302 may then use the last-known or estimated geographic location 304 of the vehicle 302 to select the predetermined trajectory from the plurality of predetermined trajectories.

Figure 3B:
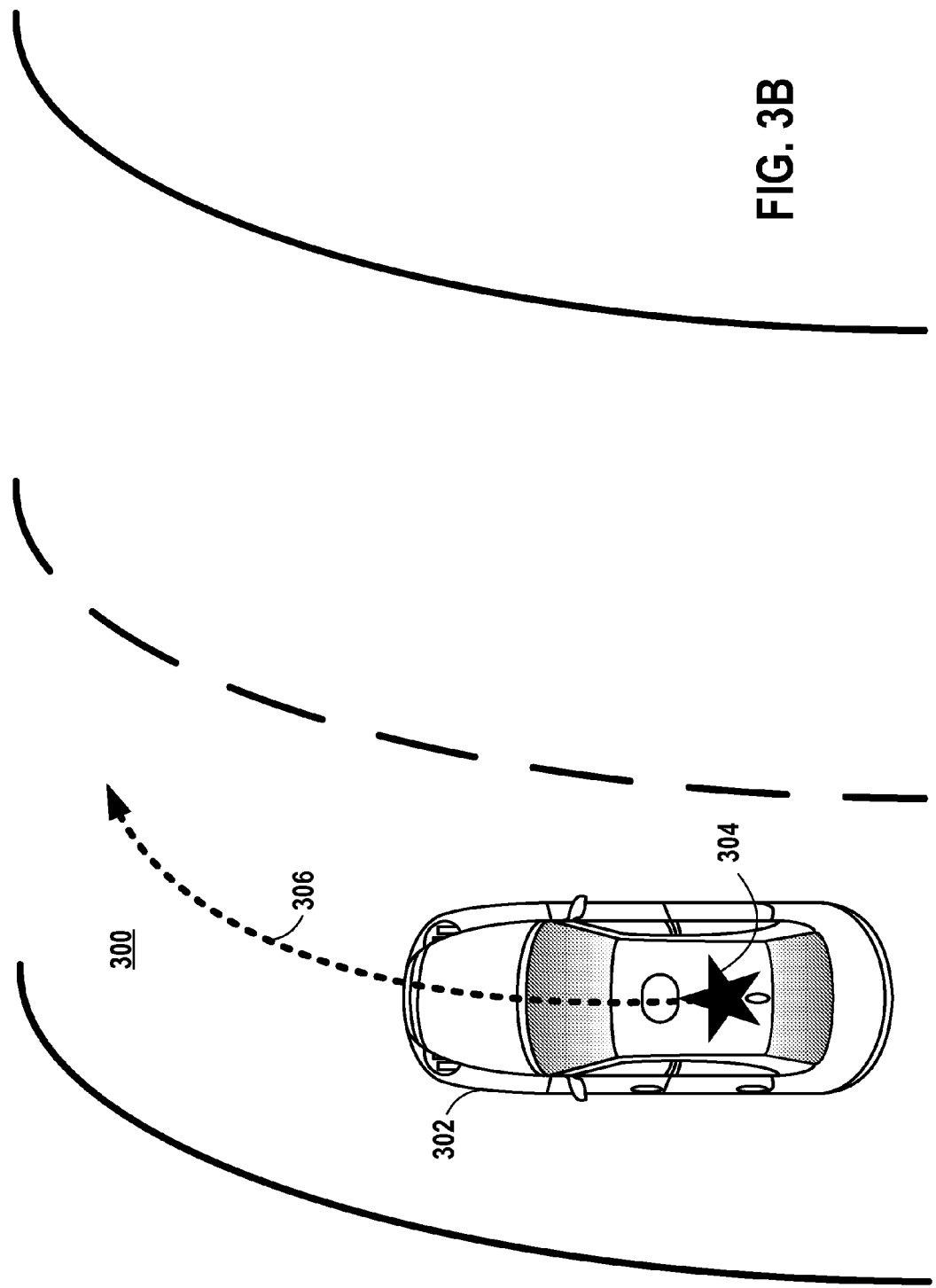

The selected predetermined trajectory 306 is shown in FIG. 3B. Further in response to determining that the lane information has become unreliable, the vehicle 302 may travel along the selected predetermined trajectory 306.

As shown, the selected predetermined trajectory 306 is expressed relative to the last-known or estimated geographic location 304 of the vehicle 302. In other embodiments, however, the selected predetermined trajectory may be expressed relative to another predetermined location on the road, such as a landmark. A selected predetermined trajectory that is expressed relative to a landmark on the road is further described in connection with FIGS. 4A-4B.

Figure 4A:
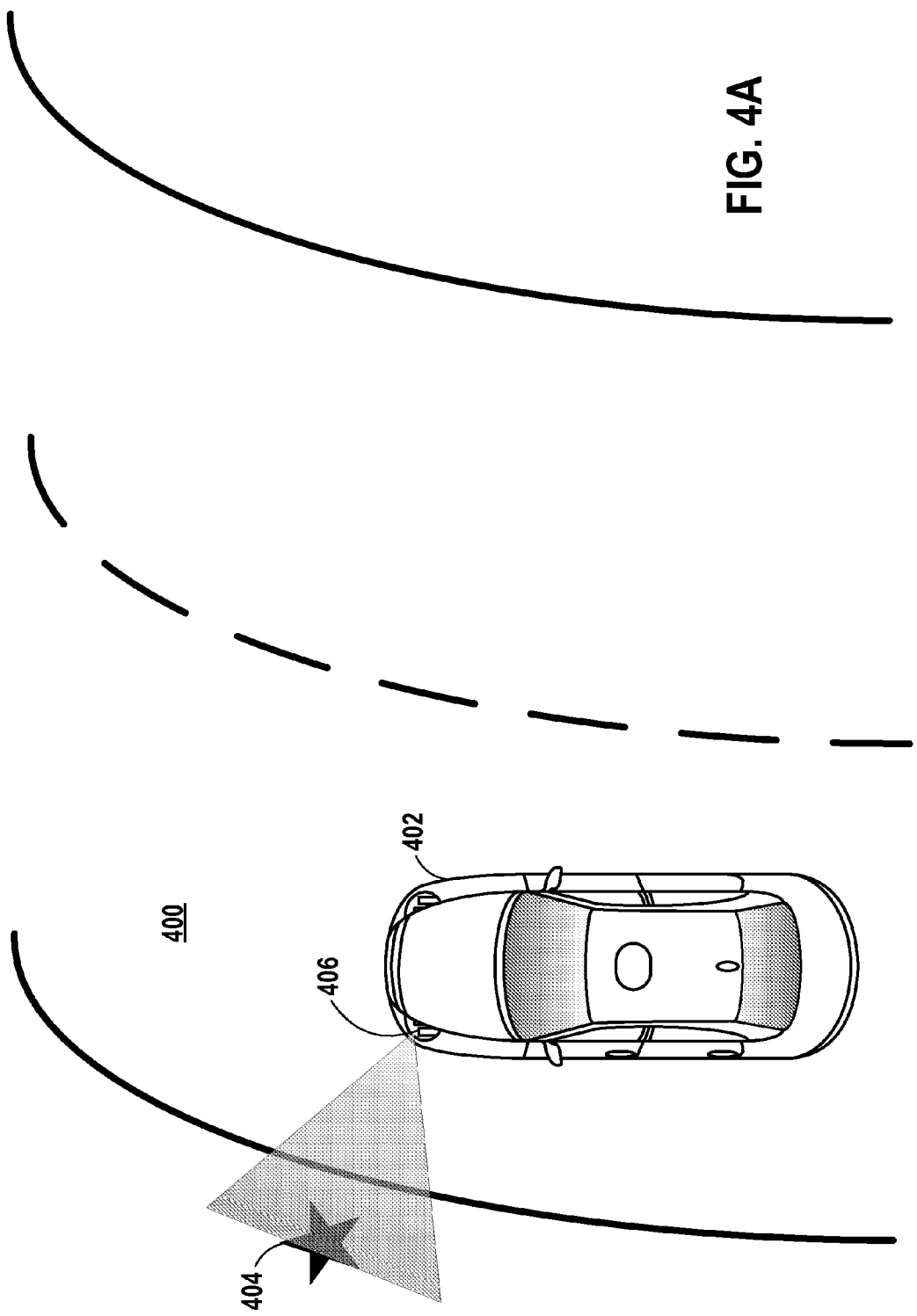

FIG. 4A illustrates an example implementation of the example method, in accordance with an embodiment. As shown in FIG. 4A, a vehicle 402 is travelling in a lane 400 on a road. The vehicle 402 includes a computer system (not shown) that is configured to control the vehicle 402 in an autonomous mode. To this end, the vehicle 402 may obtain lane information that provides an estimate of a location of the lane 400 on the road, as described above.

At some point, the vehicle 402 may determine that the lane information has become unreliable, as described above. In response to determining that the lane information has become unreliable, the vehicle 402 may select a predetermined trajectory from a plurality of predetermined trajectories. To this end, the vehicle 402 may determine a relative geographic location of the vehicle 402 relative to a landmark 404 on the road having a predetermined geographic location using a sensor 406, such as a LIDAR sensing unit. Other sensors are possible as well. The vehicle 402 may then use the predetermined geographic location of the landmark 404 and the relative geographic location of the vehicle 402 relative to the landmark 404 to determine an estimated geographic location of the vehicle 402, and may select the predetermined trajectory from the plurality of predetermined trajectories based on the estimated geographic location.

The selected predetermined trajectory 408 is shown in FIG. 4B. Further in response to determining that the lane information has become unreliable, the vehicle 402 may travel along the selected predetermined trajectory 408. As shown in FIG. 4B, the selected predetermined trajectory 408 is expressed relative to the landmark 404, as indicated by the dotted lines.

Figure 5A:
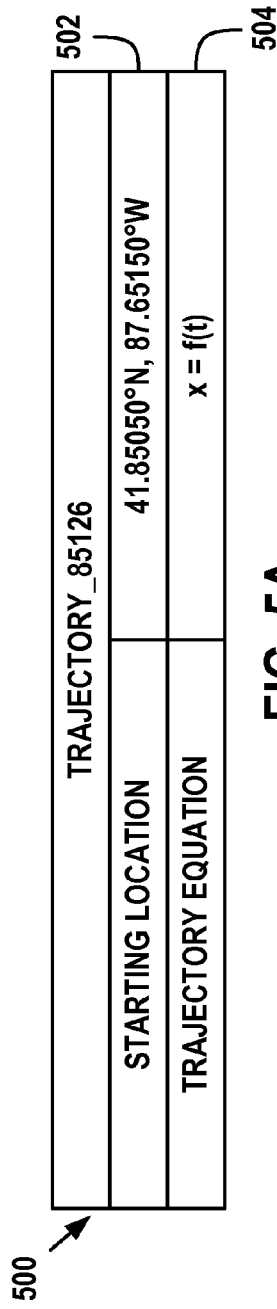
FIGS. 5A-C illustrate example predetermined trajectories, in accordance with an embodiment.
Figure 5B:
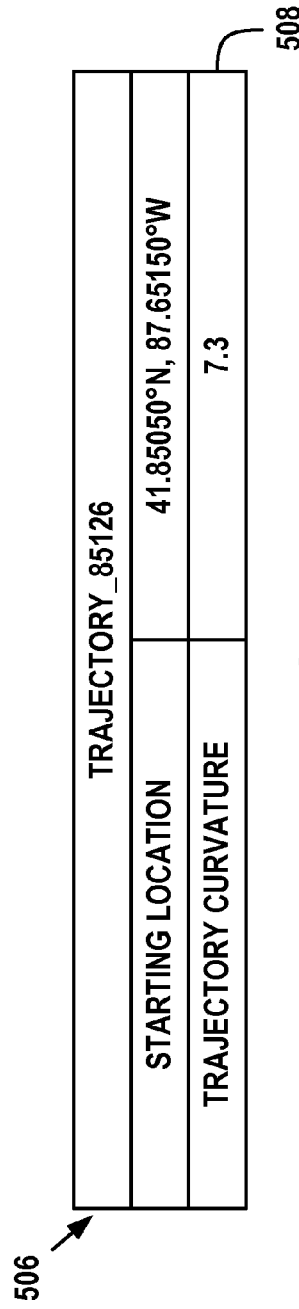
Figure 5C:
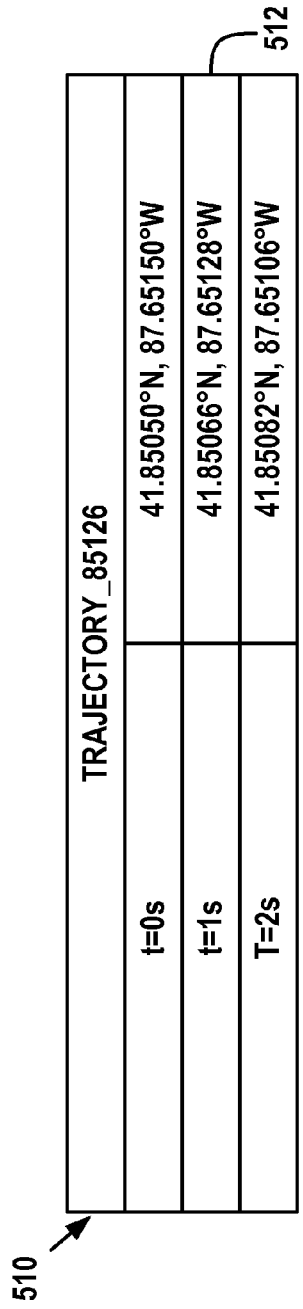

FIGS. 5A-C illustrate example predetermined trajectories, in accordance with an embodiment. It will be understood that the example trajectories shown in FIGS. 5A-C are merely illustrative and are not meant to be limiting and that other example trajectories, expressed in other manners, are possible as well.

As shown in FIG. 5A, a first example trajectory 500 includes a starting location 502 and a trajectory equation 504. The trajectory 500 may be given by a path defined by the trajectory equation 504 and starting from the starting location 502. While the starting location 502 is shown in latitude and longitude coordinates, the starting location 502 may be expressed in other manners, including other absolute geographic locations and other locations relative to predetermined locations. Similarly, while the trajectory equation 504 is shown to be expressed as a function of time, the trajectory equation 504 may be expressed in other manners, including other functions and other variables.

As shown in FIG. 5B, a second example trajectory 506 includes a starting location and a curvature 508. The trajectory 506 may be given by a path having the curvature 508 extending from the starting location. While the trajectory curvature 504 is shown to be expressed as a particular scalar value, the trajectory curvature 504 may be expressed in other manners, including other values and other units.

Further, as shown in FIG. 5C, a third example trajectory 510 includes a number of locations 512 and time intervals. The trajectory 510 may be given by a path fitted to the locations 512. While the locations 512 are shown in latitude and longitude coordinates, the locations 512 may be expressed in other manners, including other absolute geographic locations and other locations relative to predetermined locations. Further, while the time intervals are shown in seconds, the time intervals may be expressed in other manners, including other interval values and other units.

Other example trajectories are possible as well.

Systems in which example embodiments of the above example methods may be implemented will now be described in greater detail. In general, an example system may be implemented in or may take the form of a vehicle. The vehicle may take a number of forms, including, for example, automobiles, cars, trucks, motorcycles, buses, boats, airplanes, helicopters, lawn mowers, earth movers, snowmobiles, recreational vehicles, amusement park vehicles, farm equipment, construction equipment, trams, golf carts, trains, and trolleys. Other vehicles are possible as well.

Further, another example system may take the form of non-transitory computer-readable medium, which has program instructions stored thereon that are executable by at least one processor to provide the functionality described herein. An example system may also take the form of a vehicle or a subsystem of a vehicle that includes such a non-transitory computer-readable medium having such program instructions stored thereon.

Figure 6:
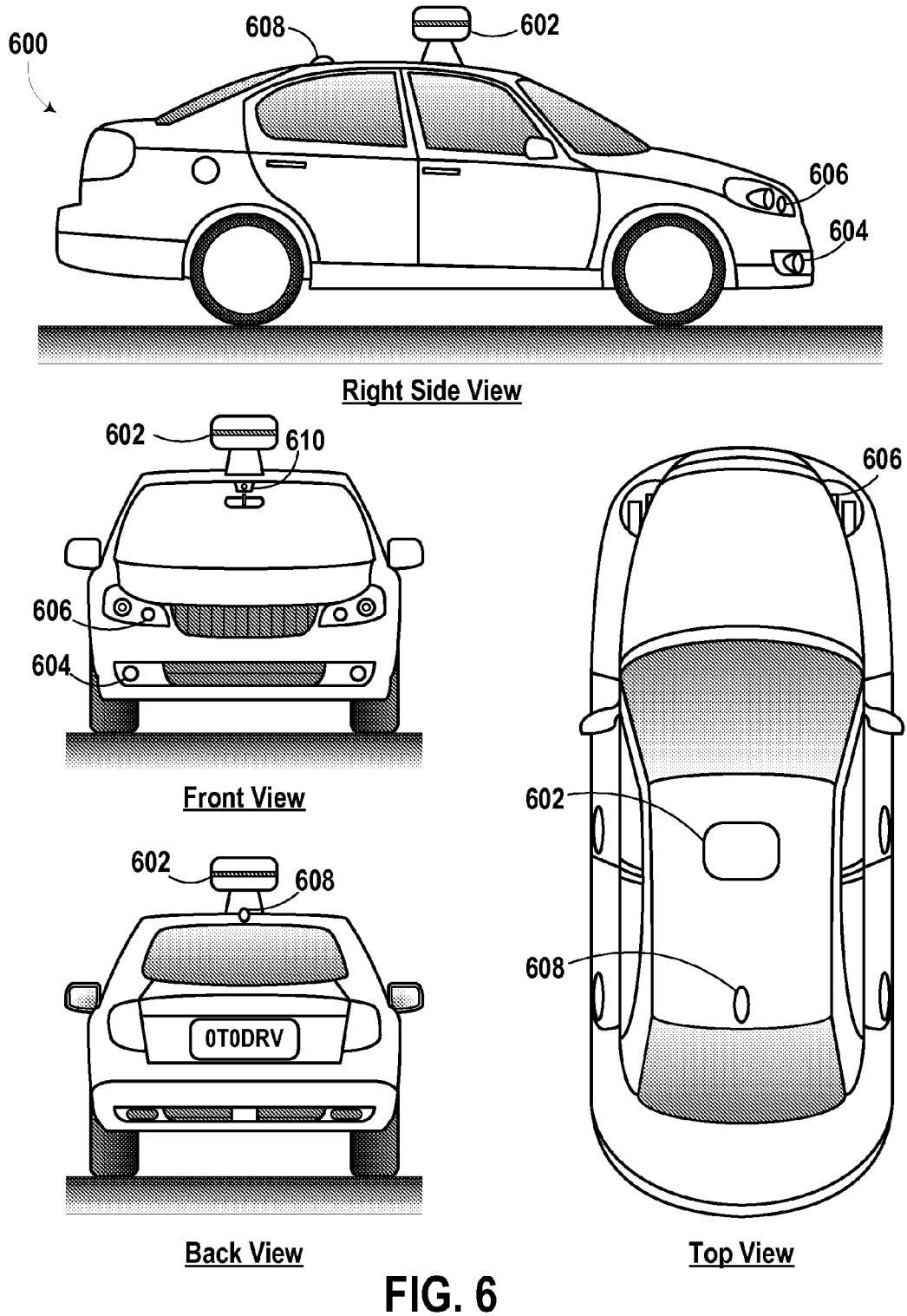
FIG. 6 illustrates an example vehicle, in accordance with an embodiment.

FIG. 6 illustrates an example vehicle 600, in accordance with an embodiment.

In particular, FIG. 6 shows a Right Side View, Front View, Back View, and Top View of the vehicle 600. Although vehicle 600 is illustrated in FIG. 6 as a car, other embodiments are possible. For instance, the vehicle 600 could represent a truck, a van, a semi-trailer truck, a motorcycle, a golf cart, an off-road vehicle, or a farm vehicle, among other examples. As shown, the vehicle 600 includes a first sensor unit 602, a second sensor unit 604, a third sensor unit 606, a wireless communication system 608, and an image-capture device 610.

Each of the first, second, and third sensor units 602-606 may include any combination of global positioning system sensors, inertial measurement units, RADAR units, laser rangefinders, LIDAR units, image-capture devices, and acoustic sensors. Other types of sensors are possible as well.

While the first, second, and third sensor units 602-606 are shown to be mounted in particular locations on the vehicle 600, in some embodiments one or more of the first, second, and third sensors units 602-606 may be mounted elsewhere on the vehicle 600, either inside or outside the vehicle 600.

Further, while only three sensor units 602-606 are shown, in some embodiments more or fewer sensor units may be included in the vehicle 600.

In some embodiments, one or more of the first, second, and third sensor units 602-606 may include one or more movable mounts on which the sensors may be movably mounted. The movable mount may include, for example, a rotating platform. Sensors mounted on the rotating platform could be rotated so that the sensors may obtain information from each direction around the vehicle 600. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some embodiments, one or more of the first, second, and third sensor units 602-606 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 608 may be any system configured to wirelessly couple to one or more other vehicles, sensors, or other entities, either directly or via a communication network. To this end, the wireless communication system 608 may include an antenna and a chipset for communicating with the other vehicles, sensors, or other entities either directly or over an air interface. The chipset or wireless communication system 608 in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 608 may take other forms as well.

While the wireless communication system 608 is shown to be positioned on a roof of the vehicle 600, in other embodiments the wireless communication system 608 could be located, fully or in part, elsewhere.

The image-capture device 610 may be any device (e.g., a still camera, a video camera, etc.) configured to capture images of the environment in which the vehicle 600 is located. To this end, the image-capture device 610 may be configured to detect visible light, or may be configured to detect light from other portions of the spectrum, such as infrared or ultraviolet light. Other types of image-capture devices are possible as well. The image-capture device 610 may be a two-dimensional detector, or may have a three-dimensional spatial range. In some embodiments, the image-capture device 610 may be, for example, a range detector configured to generate a two-dimensional image indicating a distance from the image-capture device 610 to a number of points in the environment. To this end, the image-capture device 610 may use one or more range detecting techniques. For example, the image-capture device 610 may use a structured light technique in which the vehicle 600 illuminates an object in the environment with a predetermined light pattern, such as a grid or checkerboard pattern and uses the image-capture device 610 to detect a reflection of the predetermined light pattern off the object. Based on distortions in the reflected light pattern, the vehicle 600 may determine the distance to the points on the object. The predetermined light pattern may comprise infrared light, or light of another wavelength. As another example, the image-capture device 610 may use a laser scanning technique in which the vehicle 600 emits a laser and scans across a number of points on an object in the environment. While scanning the object, the vehicle 600 uses the image-capture device 610 to detect a reflection of the laser off the object for each point. Based on a length of time it takes the laser to reflect off the object at each point, the vehicle 600 may determine the distance to the points on the object. As yet another example, the image-capture device 610 may use a time-of-flight technique in which the vehicle 600 emits a light pulse and uses the image-capture device 610 to detect a reflection of the light pulse off an object at a number of points on the object. In particular, the image-capture device 610 may include a number of pixels, and each pixel may detect the reflection of the light pulse from a point on the object. Based on a length of time it takes the light pulse to reflect off the object at each point, the vehicle 600 may determine the distance to the points on the object. The light pulse may be a laser pulse. Other range detecting techniques are possible as well, including stereo triangulation, sheet-of-light triangulation, interferometry, and coded aperture techniques, among others. The image-capture device 610 may take other forms as well.

In some embodiments, the image-capture device 610 may include a movable mount and/or an actuator, as described above, that are configured to adjust the position and/or orientation of the image-capture device 610 and/or the movable mount.

While the image-capture device 610 is shown to be mounted inside a front windshield of the vehicle 600, in other embodiments the image-capture device 610 may be mounted elsewhere on the vehicle 600, either inside or outside the vehicle 600.

The vehicle 600 may include more, fewer, and/or different components than those shown.

Figure 7:
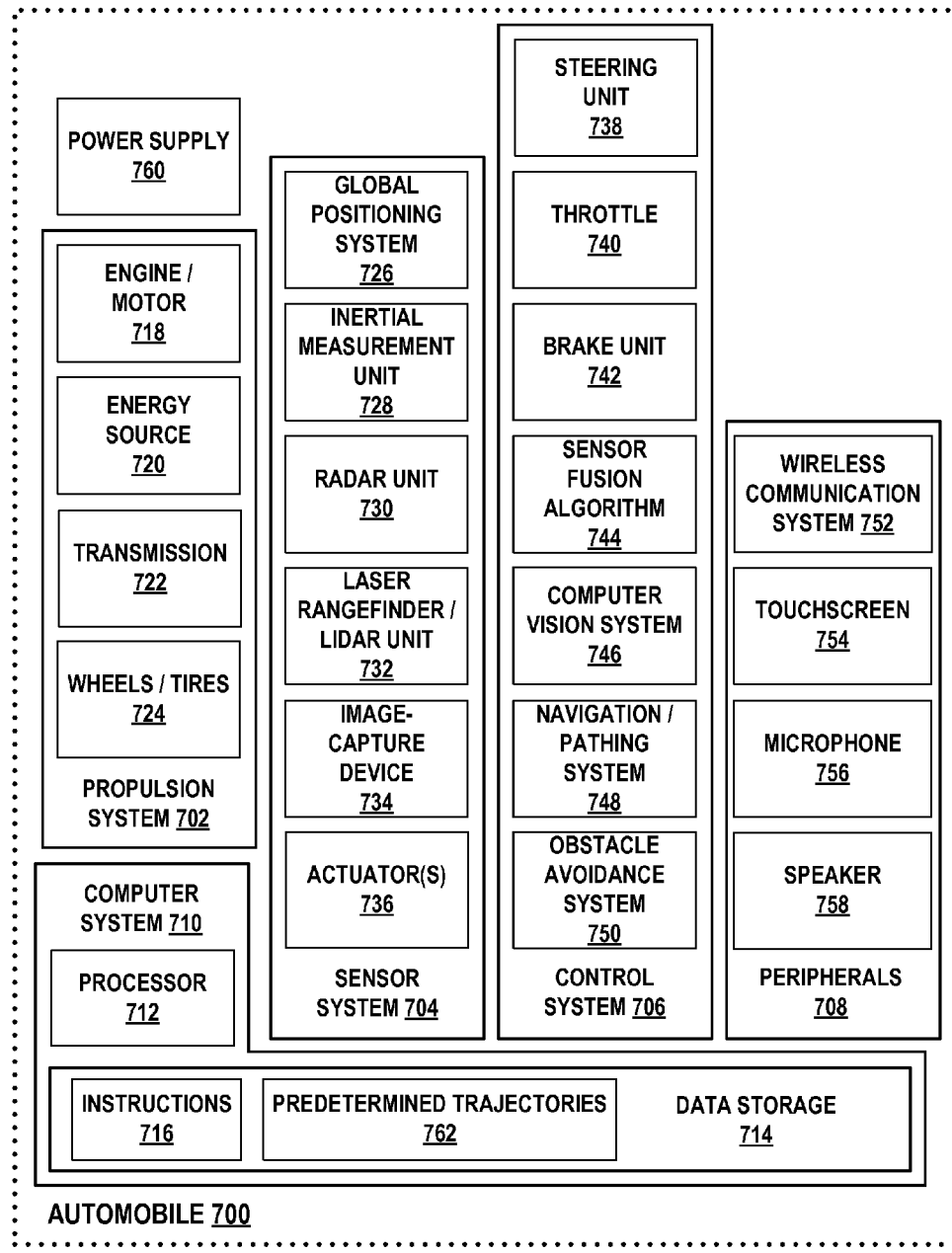
FIG. 7 is a simplified block diagram of an example vehicle, in accordance with an embodiment.

FIG. 7 is a simplified block diagram of an example vehicle 700, in accordance with an embodiment. The vehicle 700 may, for example, be similar to the vehicle 600 described above in connection with FIG. 6. The vehicle 700 may take other forms as well.

As shown, the vehicle 700 includes a propulsion system 702, a sensor system 704, a control system 706, peripherals 708, and a computer system 710 including a processor 712, data storage 714, and instructions 716. In other embodiments, the vehicle 700 may include more, fewer, or different systems, and each system may include more, fewer, or different components. Additionally, the systems and components shown may be combined or divided in any number of ways.

The propulsion system 702 may be configured to provide powered motion for the vehicle 700. As shown, the propulsion system 702 includes an engine/motor 718, an energy source 720, a transmission 722, and wheels/tires 724.

The engine/motor 718 may be or include any combination of an internal combustion engine, an electric motor, a steam engine, and a Stirling engine. Other motors and engines are possible as well. In some embodiments, the propulsion system 702 could include multiple types of engines and/or motors. For instance, a gas-electric hybrid car could include a gasoline engine and an electric motor. Other examples are possible.

The energy source 720 may be a source of energy that powers the engine/motor 718 in full or in part. That is, the engine/motor 718 may be configured to convert the energy source 720 into mechanical energy. Examples of energy sources 720 include gasoline, diesel, propane, other compressed gas-based fuels, ethanol, solar panels, batteries, and other sources of electrical power. The energy source(s) 720 could additionally or alternatively include any combination of fuel tanks, batteries, capacitors, and/or flywheels. In some embodiments, the energy source 720 may provide energy for other systems of the vehicle 700 as well.

The transmission 722 may be configured to transmit mechanical power from the engine/motor 718 to the wheels/tires 724. To this end, the transmission 722 may include a gearbox, clutch, differential, drive shafts, and/or other elements. In embodiments where the transmission 722 includes drive shafts, the drive shafts could include one or more axles that are configured to be coupled to the wheels/tires 724.

The wheels/tires 724 of vehicle 700 could be configured in various formats, including a unicycle, bicycle/motorcycle, tricycle, or car/truck four-wheel format. Other wheel/tire formats are possible as well, such as those including six or more wheels. In any case, the wheels/tires 724 of vehicle 700 may be configured to rotate differentially with respect to other wheels/tires 724. In some embodiments, the wheels/tires 724 may include at least one wheel that is fixedly attached to the transmission 722 and at least one tire coupled to a rim of the wheel that could make contact with the driving surface. The wheels/tires 724 may include any combination of metal and rubber, or combination of other materials.

The propulsion system 702 may additionally or alternatively include components other than those shown.

The sensor system 704 may include a number of sensors configured to sense information about an environment in which the vehicle 700 is located, as well as one or more actuators 736 configured to modify a position and/or orientation of the sensors. As shown, the sensors of the sensor system include a Global Positioning System (GPS) 726, an inertial measurement unit (IMU) 728, a RADAR unit 730, a laser rangefinder and/or LIDAR unit 732, and an image-capture device 734. The sensor system 704 may include additional sensors as well, including, for example, sensors that monitor internal systems of the vehicle 700 (e.g., an $O_2$ monitor, a fuel gauge, an engine oil temperature, etc.). Other sensors are possible as well.

The GPS 726 may be any sensor configured to estimate a geographic location of the vehicle 700. To this end, the GPS 726 may include a transceiver configured to estimate a position of the vehicle 700 with respect to the Earth. The GPS 726 may take other forms as well.

The IMU 728 may be any combination of sensors configured to sense position and orientation changes of the vehicle 700 based on inertial acceleration. In some embodiments, the combination of sensors may include, for example, accelerometers and gyroscopes. Other combinations of sensors are possible as well.

The RADAR 730 unit may be any sensor configured to sense objects in the environment in which the vehicle 700 is located using radio signals. In some embodiments, in addition to sensing the objects, the RADAR unit 730 may additionally be configured to sense the speed and/or heading of the objects.

Similarly, the laser rangefinder or LIDAR unit 732 may be any sensor configured to sense objects in the environment in which the vehicle 700 is located using lasers. In particular, the laser rangefinder or LIDAR unit 732 may include a laser source and/or laser scanner configured to emit a laser and a detector configured to detect reflections of the laser. The laser rangefinder or LIDAR 732 may be configured to operate in a coherent (e.g., using heterodyne detection) or an incoherent detection mode.

The image-capture device 734 may be any device (e.g., a still camera, a video camera, etc.) configured to capture images of the environment in which the vehicle 700 is located. To this end, the image-capture device 734 may take any of the forms described above in connection with the image-capture device 610 in FIG. 6.

The sensor system 704 may additionally or alternatively include components other than those shown.

The control system 706 may be configured to control operation of the vehicle 700 and its components. To this end, the control system 706 may include a steering unit 738, a throttle 740, a brake unit 742, a sensor fusion algorithm 744, a computer vision system 746, a navigation or pathing system 748, and an obstacle avoidance system 750.

The steering unit 738 may be any combination of mechanisms configured to adjust the heading of vehicle 700.

The throttle 740 may be any combination of mechanisms configured to control the operating speed of the engine/motor 718 and, in turn, the speed of the vehicle 700.

The brake unit 742 may be any combination of mechanisms configured to decelerate the vehicle 700. For example, the brake unit 742 may use friction to slow the wheels/tires 724. As another example, the brake unit 742 may convert the kinetic energy of the wheels/tires 724 to electric current. The brake unit 742 may take other forms as well.

The sensor fusion algorithm 744 may be an algorithm (or a computer program product storing an algorithm) configured to accept data from the sensor system 704 as an input. The data may include, for example, data representing information sensed at the sensors of the sensor system 704. The sensor fusion algorithm 744 may include, for example, a Kalman filter, a Bayesian network, or another algorithm. The sensor fusion algorithm 744 may further be configured to provide various assessments based on the data from the sensor system 704, including, for example, evaluations of individual objects and/or features in the environment in which the vehicle 700 is located, evaluations of particular situations, and/or evaluations of possible impacts based on particular situations. Other assessments are possible as well.

The computer vision system 746 may be any system configured to process and analyze images captured by the image-capture device 734 in order to identify objects and/or features in the environment in which the vehicle 700 is located, including, for example, traffic signals and obstacles. To this end, the computer vision system 746 may use an object recognition algorithm, a Structure from Motion (SFM) algorithm, video tracking, or other computer vision techniques. In some embodiments, the computer vision system 746 may additionally be configured to map the environment, track objects, estimate the speed of objects, etc.

The navigation and pathing system 748 may be any system configured to determine a driving path for the vehicle 700. The navigation and pathing system 748 may additionally be configured to update the driving path dynamically while the vehicle 700 is in operation. In some embodiments, the navigation and pathing system 748 may be configured to incorporate data from the sensor fusion algorithm 744, the GPS 726, and one or more predetermined maps so as to determine the driving path for vehicle 700.

The obstacle avoidance system 750 may be any system configured to identify, evaluate, and avoid or otherwise negotiate obstacles in the environment in which the vehicle 700 is located.

The control system 706 may additionally or alternatively include components other than those shown.

Peripherals 708 may be configured to allow the vehicle 700 to interact with external sensors, other vehicles, and/or a user. To this end, the peripherals 708 may include, for example, a wireless communication system 752, a touchscreen 754, a microphone 756, and/or a speaker 758.

The wireless communication system 752 may take any of the forms described above.

The touchscreen 754 may be used by a user to input commands to the vehicle 700. To this end, the touchscreen 754 may be configured to sense at least one of a position and a movement of a user's finger via capacitive sensing, resistance sensing, or a surface acoustic wave process, among other possibilities. The touchscreen 754 may be capable of sensing finger movement in a direction parallel or planar to the touchscreen surface, in a direction normal to the touchscreen surface, or both, and may also be capable of sensing a level of pressure applied to the touchscreen surface. The touchscreen 754 may be formed of one or more translucent or transparent insulating layers and one or more translucent or transparent conducting layers. The touchscreen 754 may take other forms as well.

The microphone 756 may be configured to receive audio (e.g., a voice command or other audio input) from a user of the vehicle 700. Similarly, the speakers 758 may be configured to output audio to the user of the vehicle 700.

The peripherals 708 may additionally or alternatively include components other than those shown.

The computer system 710 may be configured to transmit data to and receive data from one or more of the propulsion system 702, the sensor system 704, the control system 706, and the peripherals 708. To this end, the computer system 710 may be communicatively linked to one or more of the propulsion system 702, the sensor system 704, the control system 706, and the peripherals 708 by a system bus, network, and/or other connection mechanism (not shown).

The computer system 710 may be further configured to interact with and control one or more components of the propulsion system 702, the sensor system 704, the control system 706, and/or the peripherals 708. For example, the computer system 710 may be configured to control operation of the transmission 722 to improve fuel efficiency. As another example, the computer system 710 may be configured to cause the image-capture device 734 to capture images of the environment. As yet another example, the computer system 710 may be configured to store and execute instructions corresponding to the sensor fusion algorithm 744. As still another example, the computer system 710 may be configured to store and execute instructions for displaying a display on the touchscreen 754. Other examples are possible as well.

As shown, the computer system 710 includes the processor 712 and data storage 714. The processor 712 may comprise one or more general-purpose processors and/or one or more special-purpose processors. To the extent the processor 712 includes more than one processor, such processors could work separately or in combination. Data storage 714, in turn, may comprise one or more volatile and/or one or more non-volatile storage components, such as optical, magnetic, and/or organic storage, and data storage 714 may be integrated in whole or in part with the processor 712.

In some embodiments, data storage 714 may contain instructions 716 (e.g., program logic) executable by the processor 712 to execute various vehicle functions, including those described above in connection with FIGS. 1-4B. Data storage 714 may contain additional instructions as well, including instructions to transmit data to, receive data from, interact with, and/or control one or more of the propulsion system 702, the sensor system 704, the control system 706, and the peripherals 708. Further, in some embodiments, data storage 714 may include a plurality of predetermined trajectories 762. The predetermined trajectories 762 may take any of the forms described above.

The computer system 702 may additionally or alternatively include components other than those shown.

As shown, the vehicle 700 further includes a power supply 760, which may be configured to provide power to some or all of the components of the vehicle 700. To this end, the power supply 760 may include, for example, a rechargeable lithium-ion or lead-acid battery. In some embodiments, one or more banks of batteries could be configured to provide electrical power. Other power supply materials and configurations are possible as well. In some embodiments, the power supply 760 and energy source 720 may be implemented together, as in some all-electric cars.

In some embodiments, one or more of the propulsion system 702, the sensor system 704, the control system 706, and the peripherals 708 could be configured to work in an interconnected fashion with other components within and/or outside their respective systems.

Further, the vehicle 700 may include one or more elements in addition to or instead of those shown. For example, the vehicle 700 may include one or more additional interfaces and/or power supplies. Other additional components are possible as well. In such embodiments, data storage 714 may further include instructions executable by the processor 712 to control and/or communicate with the additional components.

Still further, while each of the components and systems are shown to be integrated in the vehicle 700, in some embodiments, one or more components or systems may be removably mounted on or otherwise connected (mechanically or electrically) to the vehicle 700 using wired or wireless connections.

The vehicle 700 may take other forms as well.

Figure 8:
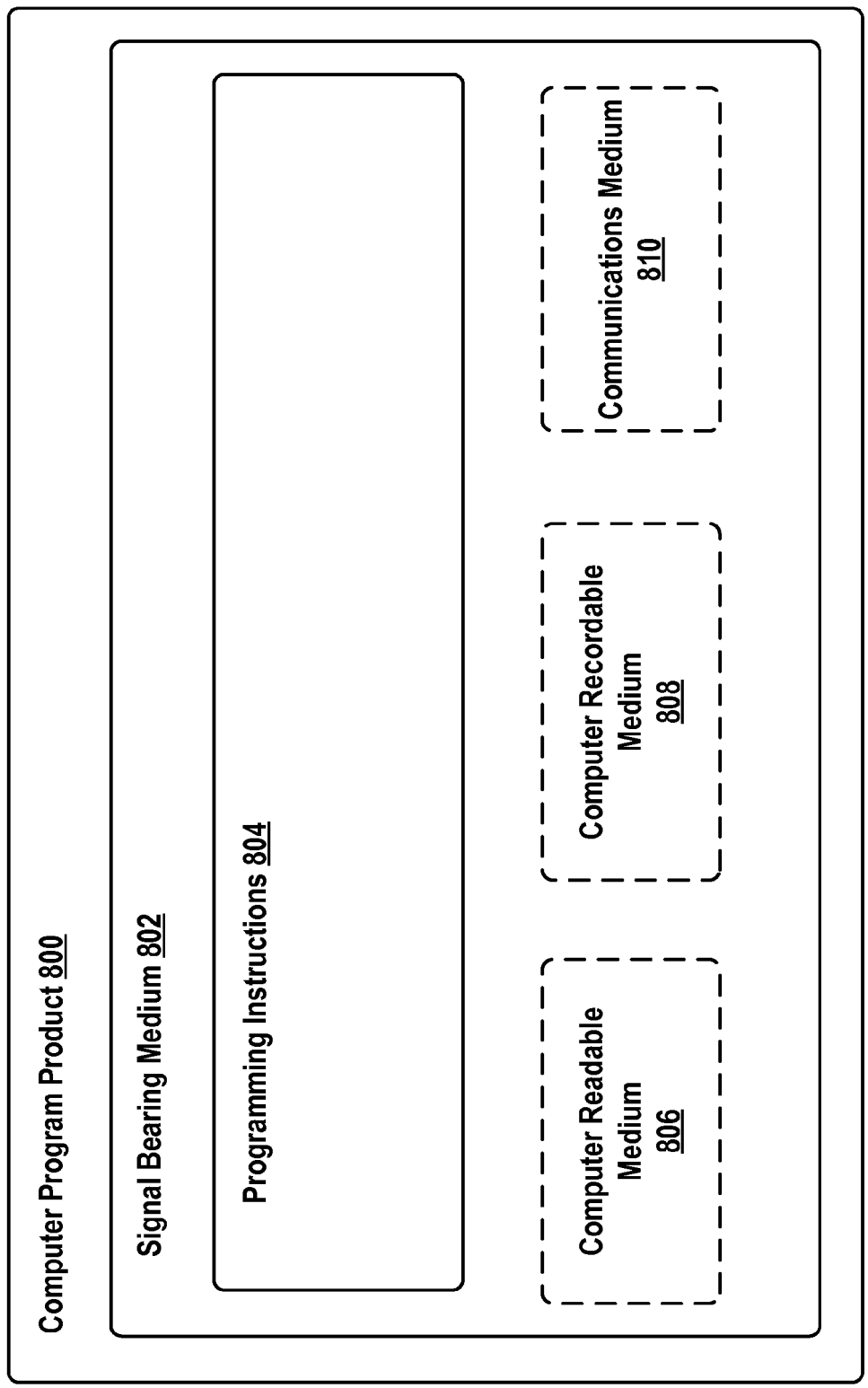
FIG. 8 is a simplified block diagram of an example computer program product, in accordance with an embodiment.

In some embodiments, the disclosed methods may be implemented as computer program instructions encoded on a non-transitory computer-readable storage media in a machine-readable format, or on other non-transitory media or articles of manufacture. FIG. 8 is a schematic illustrating a conceptual partial view of an example computer program product 800 that includes a computer program for executing a computer process on a computing device, arranged according to at least some embodiments presented herein.

In one embodiment, the example computer program product 800 is provided using a signal bearing medium 802. The signal bearing medium 802 may include one or more programming instructions 804 that, when executed by one or more processors, may provide functionality or portions of the functionality described above with respect to FIGS. 1-4B.

In some embodiments, the signal bearing medium 802 may encompass a computer-readable medium 806, such as, but not limited to, a hard disk drive, a Compact Disc (CD), a Digital Video Disk (DVD), a digital tape, memory, etc. Further, in some embodiments the signal bearing medium 802 may encompass a computer recordable medium 808, such as, but not limited to, memory, read/write (R/W) CDs, R/W DVDs, etc. Still further, in some embodiments the signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, the signal bearing medium 802 may be conveyed by a wireless form of the communications medium 810.

The one or more programming instructions 804 may be, for example, computer executable and/or logic implemented instructions. In some examples, a computing device (e.g., the computer system 710 of FIG. 7) may be configured to provide various operations, functions, or actions in response to the programming instructions 804 being conveyed to the computing device by one or more of the computer readable medium 806, the computer recordable medium 808, and/or the communications medium 810.

The non-transitory computer readable medium may also be distributed among multiple data storage elements, which could be remotely located from each other.

In some embodiments, the computing device that executes some or all of the programming instructions 804 could be a vehicle, such as the vehicle 700 illustrated in FIG. 7. Other computing devices are possible as well.

Figure 9A:
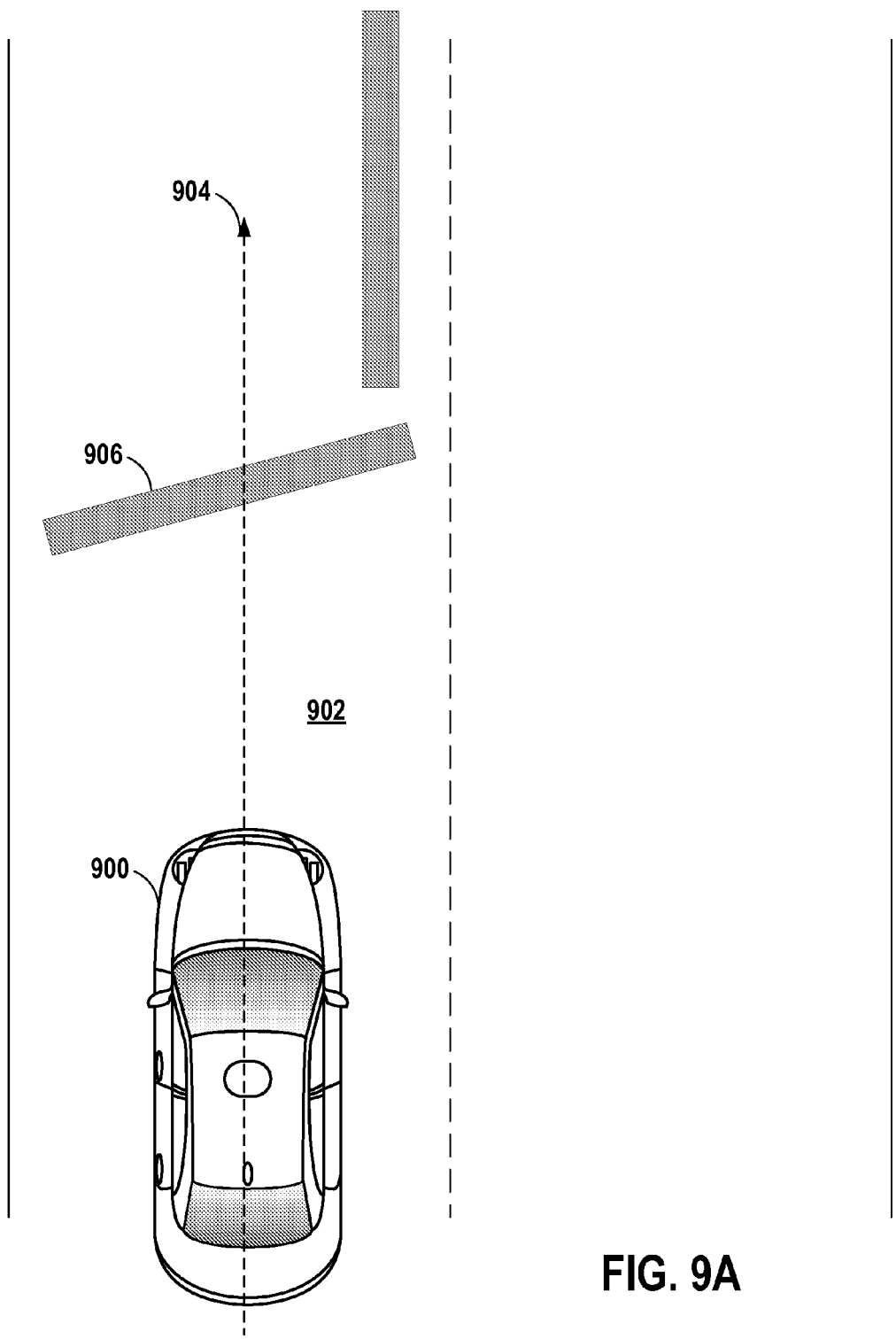
FIGS. 9A-B illustrate an example determination of a predetermined trajectory, in accordance with an embodiment.
Figure 9B:
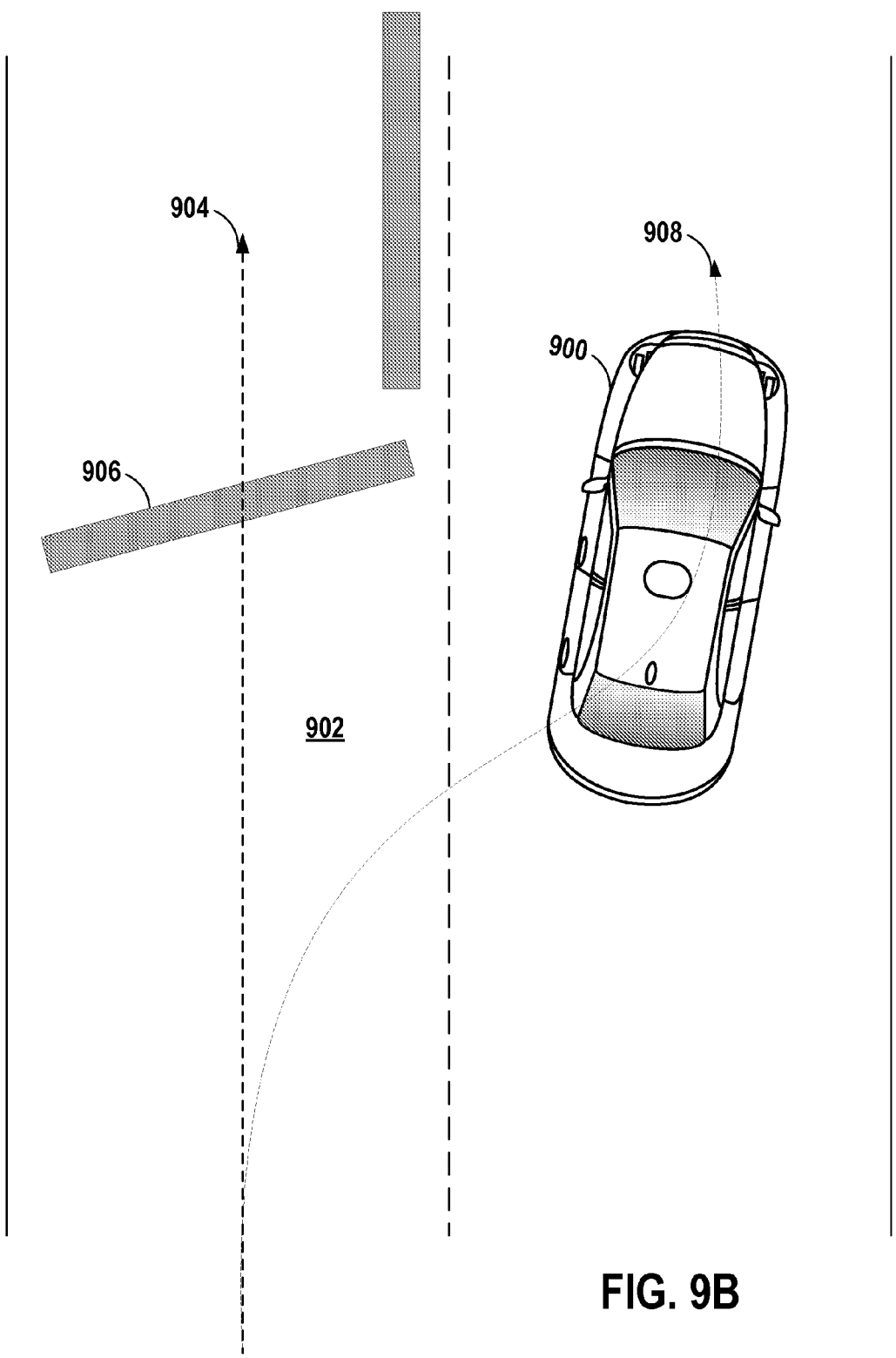

As described above, the predetermined trajectories may be predetermined in a number of ways. FIGS. 9A-B illustrate an example determination of a predetermined trajectory, in accordance with an embodiment.

As shown in FIG. 9A, a vehicle 900 may travel in a lane 902 on a road. The vehicle 900 may be operated in a manual mode (e.g., may be controlled by a driver). To this end, the vehicle 900 may be, for example, a vehicle only configured to be operated in a manual mode, or may be a vehicle configured to operate in both an autonomous mode and a manual mode (such as the vehicle 700 described above) but currently operated in a manual mode. In some embodiments, the vehicle 900 may be a vehicle that has previously been determined to be reliable. To this end, the vehicle 900 may be operated by a particular company or organization and/or by a trained driver. The vehicle 900 may take other forms as well.

A server (not shown) may maintain a predetermined trajectory 904 for the lane 902 on the road. As shown, the predetermined trajectory 904 coincides with the lane 902 on the road. Alternatively, no predetermined trajectory may be maintained.

The vehicle 900 may travel in the lane 902 and, accordingly, along the predetermined trajectory 904. At some point, though, the driver of the vehicle may become aware of an obstacle 906 in the lane 902. The obstacle may be, for example, construction. Other obstacles are possible as well.

Accordingly, the driver may cause the vehicle 900 to travel around the obstacle 906. As the vehicle 900 travels around the obstacle 906, the vehicle 900 may travel along a new trajectory 908, as shown in FIG. 9B. While the vehicle 900 travels along the new trajectory 908, the vehicle 900 may store the new trajectory 908. Further, the vehicle 900 may provide the new predetermined trajectory 908 to the server. The vehicle 900 may provide the new trajectory 908 to the server in a number of manners. For example, the vehicle 900 may provide the new trajectory 908 directly to the server (e.g., by uploading the new trajectory 908). As another example, the vehicle 900 may provide the new trajectory 908 to a sensor (e.g., a sensor along the road, a nearby sensor, and/or a sensor at its destination) or other device configured to provide the new trajectory 908 to the server. Other examples are possible as well.

Upon receiving the new trajectory 908, the server may determine whether the predetermined trajectory 904 should be replaced or modified in light of the new trajectory 908, or whether the new trajectory 908 should be discarded. To this end, the server may compare the new trajectory 908 with the predetermined trajectory 904 to determine, for example, a similarity of the new trajectory 908 and the predetermined trajectory 904.

In embodiments where the new trajectory 908 is not very similar to the predetermined trajectory 904 (as in the example shown in FIG. 9B), the server may, for example, discard the new trajectory 908 as an outlier. This may prevent modifying the predetermined trajectory 904 on account of, for instance, lane changes or other inconsistent trajectories. Alternatively, the server may, for example, store the new trajectory 908 and trigger a flag (or otherwise indicate) that the predetermined trajectory 904 may need to be updated. Thereafter, the server may compare additional new trajectories with both the predetermined trajectory 904 and the new trajectory 908. If, for example, a threshold number of additional new trajectories are more similar to the new trajectory 908 than the predetermined trajectory 904 (e.g., indicating that recent vehicles are travelling along trajectories closer to the new trajectory 908 than the predetermined trajectory 904), the server may calculate a combination (e.g., a mean, a weighted mean, a truncated mean, a median, a mode, etc.) using the new trajectory 908 and/or some or all of the additional new trajectories and may replace the predetermined trajectory 904 with the updated predetermined trajectory.

In embodiments where the new trajectory 908 is very similar to the predetermined trajectory 904, the server may, for example, modify the predetermined trajectory 904 in light of the new trajectory 908. For instance, the server may recalculate a combination (e.g., a mean, a weighted mean, a truncated mean, a median, a mode, etc.) used to determine the predetermined trajectory 904 to determine an updated predetermined trajectory. The updated predetermined trajectory may, for example, have improved robustness on account of the additional new trajectory 908 used to determine the combination. Alternatively, if the new trajectory 908 is essentially repetitive of other predetermined trajectories used to determine the combination, the server may, for example, discard the new trajectory 908 and maintain the predetermined trajectory 904. Other examples are possible as well.

In embodiments where no predetermined trajectory 904 is yet determined, the server may store the new trajectory 908 as the predetermined trajectory.

The server may modify or replace the predetermined trajectory 904 in other manners as well. Further, additional new trajectories may be travelled by vehicles and provided to the server as described above for the new trajectory 908. Each new trajectory 908 may be used by server to modify or replace the predetermined trajectory 904, or may be discarded, as described above.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method comprising:
obtaining, by a computer system, lane information that provides an estimated location of a lane of a road on which a vehicle is travelling, wherein the computer system is configured to control the vehicle in an autonomous mode;
determining, by the computer system, that the lane information has become unavailable or unreliable; and
in response to determining that the lane information has become unavailable or unreliable, the computer system:
selecting a predetermined trajectory from a plurality of predetermined trajectories, wherein at least one of the plurality of predetermined trajectories is a combination of trajectories previously travelled by other vehicles, and
controlling the vehicle to travel along the selected predetermined trajectory.

2. The method of claim 1, wherein the lane information is based on a predetermined map of the road.

3. The method of claim 2, wherein determining that the lane information has become unavailable or unreliable comprises detecting that the lane information is not included in the predetermined map of the road.

4. The method of claim 2, wherein determining that the lane information has become unavailable or unreliable comprises detecting that there is an error in the predetermined map.

5. The method of claim 1, wherein the combination of trajectories previously travelled by other vehicles is a mean, a weighted mean, a truncated mean, a median, or a mode.

6. The method of claim 1, wherein the selected predetermined trajectory is expressed in absolute geographic coordinates.

7. The method of claim 1, wherein the selected predetermined trajectory is expressed relative to a predetermined location on the road.

8. The method of claim 1, wherein selecting the predetermined trajectory from the plurality of predetermined trajectories comprises reading the selected predetermined trajectory from data storage at the vehicle.

9. The method of claim 1, wherein selecting the predetermined trajectory from the plurality of predetermined trajectories comprises:
- querying a server for the plurality of predetermined trajectories;
- receiving the plurality of predetermined trajectories;
- storing the plurality of predetermined trajectories in data storage; and
- reading the selected predetermined trajectory from data storage at the vehicle.

10. The method of claim 1, further comprising:
- periodically obtaining, by a computer system, updated lane information that provides an updated estimated location of the lane;
- determining, by the computer system, that the updated lane information has become reliable; and
- in response to determining that the updated lane information has become reliable, ceasing to control the vehicle to travel along the selected predetermined trajectory.

11. A vehicle comprising:
at least one processor; and
data storage comprising (i) a plurality of predetermined trajectories and (ii) instructions executable by the at least one processor to cause a computer system to perform functions comprising:
- obtaining lane information that provides an estimated location of a lane of a road on which a vehicle is travelling, wherein the computer system is configured to control the vehicle in an autonomous mode;
- determining that the lane information has become unavailable or unreliable; and
- in response to determining that the lane information has become unavailable or unreliable, the computer system:
  - selecting a predetermined trajectory from a plurality of predetermined trajectories, wherein at least one of the plurality of predetermined trajectories is a combination of trajectories previously travelled by other vehicles, and
  - controlling the vehicle to travel along the selected predetermined trajectory.

12. The vehicle of claim 11, wherein the lane information is based on a predetermined map of the road.

13. The vehicle of claim 12, further comprising a location sensor configured to determine a location of the vehicle within the predetermined map of the road.

14. The vehicle of claim 11, wherein determining that the lane information has become unavailable or unreliable comprises detecting that the lane information is not included in the predetermined map of the road.

15. The vehicle of claim 11, wherein determining that the lane information has become unavailable or unreliable comprises detecting that there is an error in the predetermined map.

16. The vehicle of claim 15, further comprising a sensor configured to sense information about an environment surrounding the vehicle, wherein detecting that there is an error in the predetermined map comprises detecting that the sensed information contradicts the predetermined map.

17. The vehicle of claim 11, further comprising a web-based interface configured to send to a server a query for the plurality of predetermined trajectories and receive from the server the plurality of predetermined trajectories.

18. The vehicle of claim 11, wherein the combination of trajectories previously travelled by other vehicles is a mean, a weighted mean, a truncated mean, a median, or a mode.

19. A non-transitory computer-readable medium having stored therein instructions executable by a computing device to cause the computing device to perform functions comprising:
- obtaining lane information that provides an estimated location of a lane of a road on which a vehicle is travelling, wherein the computing device is configured to control the vehicle in an autonomous mode;
- determining that the lane information has become unavailable or unreliable; and
- in response to determining that the lane information has become unavailable or unreliable, the computer system:
  - selecting a predetermined trajectory from a plurality of predetermined trajectories, wherein at least one of the plurality of predetermined trajectories is a combination of trajectories previously travelled by other vehicles, and
  - controlling the vehicle to travel along the selected predetermined trajectory.

20. The non-transitory computer readable medium of claim 19, wherein the combination of trajectories previously travelled by other vehicles is a mean, a weighted mean, a truncated mean, a median, or a mode.

* * * * *